United States Patent
Mao et al.

(10) Patent No.: US 9,748,817 B2
(45) Date of Patent: Aug. 29, 2017

(54) GEAR MOTOR ASSEMBLY

(71) Applicant: Johnson Electric S.A., Murten (CH)

(72) Inventors: Wei Xing Mao, Rochester Hills, MI (US); Fan Ouyang, Shenzhen (CN); Xiao Liang Yue, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 151 days.

(21) Appl. No.: 14/689,889

(22) Filed: Apr. 17, 2015

(65) Prior Publication Data

US 2015/0303769 A1 Oct. 22, 2015

(30) Foreign Application Priority Data

Apr. 18, 2014 (CN) .......................... 2014 1 0159387

(51) Int. Cl.
| | |
|---|---|
| *H02K 7/116* | (2006.01) |
| *H02K 15/08* | (2006.01) |
| *B60J 1/17* | (2006.01) |
| *H02K 15/02* | (2006.01) |
| *H02K 7/08* | (2006.01) |
| *E05F 15/697* | (2015.01) |
| *H02K 5/14* | (2006.01) |
| *H02K 5/22* | (2006.01) |
| *H02K 13/00* | (2006.01) |
| *H02K 15/14* | (2006.01) |

(52) U.S. Cl.
CPC .......... *H02K 7/1166* (2013.01); *H02K 5/148* (2013.01); *H02K 5/225* (2013.01); *H02K 7/081* (2013.01); *H02K 13/006* (2013.01); *H02K 15/02* (2013.01); *H02K 15/08* (2013.01); *H02K 15/14* (2013.01); *E05F 15/697* (2015.01)

(58) Field of Classification Search
CPC ..... E05F 15/697; H02K 13/006; H02K 15/02; H02K 15/08; H02K 15/14; H02K 5/148; H02K 5/225; H02K 7/081; H02K 7/1166
USPC ................................ 310/83; 29/597; 49/349
See application file for complete search history.

(56) References Cited

U.S. PATENT DOCUMENTS 3,302,048 A * 1/1967 Gray .................... F16C 23/045
310/90
4,041,730 A * 8/1977 Kress .................... B63H 23/34
403/228

(Continued)

FOREIGN PATENT DOCUMENTS

JP 2006-311655 A 11/2006

*Primary Examiner* — Alex W Mok
(74) *Attorney, Agent, or Firm* — Muncy, Geissler, Olds & Lowe, P.C.

(57) ABSTRACT

A gear motor assembly includes a motor and a gearbox connected together. The motor includes a stator and a rotor. The stator has a housing, magnets attached to the housing, and brushes. The rotor includes a shaft with a rotor core, a commutator, a sleeve, a bushing and a worm mounted thereon. The bushing is slidably located between the commutator and worm. The sleeve is located between the commutator and the bushing. The rotor is balanced with the worm fix to the shaft. The gearbox includes a casing having an opening, and a worm gear received in the casing. The brushes of the motor are mounted in the casing. The shaft has a first end that extends into the gearbox. The bushing is fixed in the casing via a bushing seat.

18 Claims, 6 Drawing Sheets

(56) References Cited

U.S. PATENT DOCUMENTS

| | | | | |
|---|---|---|---|---|
| 4,652,781 | A | * | 3/1987 | Andrei-Alexandru . B60J 7/0573 192/12 BA |
| 4,885,948 | A | * | 12/1989 | Thrasher, Jr. .......... H02K 7/081 310/83 |
| 5,747,903 | A | * | 5/1998 | Klingler ................ E05F 15/697 310/43 |
| 6,217,453 | B1 | * | 4/2001 | Thompson ................ F16D 3/50 384/208 |
| 6,486,577 | B1 | * | 11/2002 | Ursel ................... B60N 2/4435 310/51 |
| 6,831,381 | B2 | * | 12/2004 | Ursel ...................... F16C 23/04 310/239 |
| 2002/0053249 | A1 | * | 5/2002 | Jammer ............... B62D 5/0409 74/425 |
| 2002/0096005 | A1 | * | 7/2002 | Oka .................... B62D 5/0409 74/388 PS |
| 2006/0238048 | A1 | * | 10/2006 | Sesita .................... H02K 5/10 310/88 |
| 2006/0243078 | A1 | * | 11/2006 | Sesita .................... F16C 25/08 74/425 |
| 2010/0079020 | A1 | * | 4/2010 | Tang ........................ F16H 1/16 310/83 |

* cited by examiner

GEAR MOTOR ASSEMBLY

CROSS REFERENCE TO RELATED APPLICATIONS

This non-provisional patent application claims priority under 35 U.S.C. §119(a) from Patent Application No. 201410159387.5 filed in The People's Republic of China on Apr. 18, 2014, the entire contents of which are hereby incorporated by reference.

FIELD OF THE INVENTION

This invention relates to a gear motor assembly and in particular to a gear motor assembly having improved balance performance while preventing the shaft from bending.

BACKGROUND OF THE INVENTION

A gear motor assembly, such as a window lift drive used in a vehicle to raise or lower a window, typically includes a motor and a gearbox. The gearbox includes a casing and a worm gear disposed in the casing. The motor includes a stator and a rotor. The stator includes a housing with an open end, and an end cap covering the open end of the housing. The rotor is received in the housing and has a shaft with one end extending through the end cap and into the casing. A bearing is mounted on the end cap to rotatably support the shaft. A worm cog, referred to herein after as the worm, in mesh with the worm gear, is mounted on the shaft and rotates with the shaft to drive the worm gear.

As the worm has a diameter larger than a diameter of the inner hole of the end cap, the worm must be mounted to the shaft after the shaft extends through the end cap. However, as the rotor is balanced before being assembled to the end cap, the worm which is assembled latter may adversely affect the balance of the rotor. One option is to eliminate the end cap, but this raises the problem of how to mount the bearing as the bearing is required to support the shaft near the worm to prevent the shaft from bending under the counterforce exerted on the worm by the worm gear during operation.

Therefore, there is a desire for an improved gear motor assembly which can overcome the above described shortcomings.

SUMMARY OF THE INVENTION

Accordingly, in one aspect thereof, the present invention provides a gear motor assembly comprising: a motor comprising a stator and a rotor, the stator comprising a housing, at least one magnet attached into the housing, and a plurality of brush assemblies, and the rotor comprising a shaft, a rotor core and a commutator fixed to the shaft; a gearbox connected with the motor, the gearbox comprising a casing having an opening, a worm and a worm gear in mesh with each other received in the casing, the shaft of the motor has a first end extending into the gearbox, and the worm is fixed on the shaft, and the brush assemblies of the motor are mounted in the casing at the opening; a bushing slidably mounted on the shaft of the motor between the commutator and the worm and fixed in the casing of the gearbox; and a sleeve fixed to the shaft of the motor between the commutator and the bushing to push the bushing into the casing of the gearbox during the insertion of the shaft into the gearbox, wherein the rotor of the motor is balanced together with the worm, and the bushing is fixedly mounted in the casing of the gearbox.

Preferably, the bushing is mounted to the casing of the gearbox via a bushing seat.

Preferably, the bushing seat comprises a base ring having a central hole, and a plurality of segments extending perpendicular from a surface of the base ring around the central hole, the plurality of segments cooperatively define a receiving space in which the bushing is disposed.

Preferably, the bushing has a spherical shape and the receiving space of the bushing seat has a shape substantially corresponding to the shape of the bushing.

Preferably, each segment of the bushing seat has a fixed end adjoining the base ring, and a free end remote from the base ring, the free ends of the segments are spaced from each other and define an opening for insertion of the bushing.

Preferably, the free ends of the segments form a tapered surface in an inner surface, the tapered surface is inclined radially and outwardly towards the opening to increase the size of the opening.

Preferably, at least one segment has an enhanced portion at an outer surface thereof, the enhanced portion is pressed by the casing and deformed to increase friction between the bushing seat and the casing.

Preferably, the enhanced portion is formed as a protrusion integrally formed on the outer surface of the segment.

Preferably, the casing of the gearbox comprises a first chamber for accommodating the brush assemblies and the commutator of the motor, and a second chamber for accommodating the bushing and the worm, the second chamber having a diameter smaller than the diameter of the first chamber.

Preferably, the sleeve has an outer diameter smaller than the diameter of the second chamber.

Preferably, a stop surface is formed in the second chamber, the stop surface faces the first chamber to stop the bushing when the bushing reaches a predetermined mounting position.

According to a second aspect, the present invention provides a window lift drive used in a vehicle to raise or lower a winding, comprising the gear motor assembly described above.

According to a third aspect thereof, the present invention provides a method of assembling a gear motor assembly, comprising the steps of: 1) providing a stator of a motor, comprising assembling at least one magnet to an inner surface of a housing, and providing a plurality of brush assemblies; 2) providing a rotor of a motor, comprising assembling a rotor core, a commutator onto a shaft and winding windings onto the rotor core; 3) fixing a sleeve onto the shaft of the motor; 4) assembling a bushing onto the shaft of the motor; 5) fixing a worm to the shaft of the motor; 6) balancing the rotor with the worm fixed to the shaft; 7) providing a gearbox, comprising assembling a worm gear into a casing; 8) assembling the motor, comprising assembling the rotor into the stator, with a first end of the shaft where the worm locates protruding outside of the housing of the stator, and mounting the brush assemblies onto the casing of the gearbox; and 9) assembling the motor to the gearbox, comprising inserting the first end of the shaft into the casing of the gearbox, and joining together the casing of the gearbox and the housing of the motor.

Preferably, a step of assembling the bushing in a bushing seat occurs before the step to assemble the bushing onto the shaft of the motor.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENT

Figure 1:
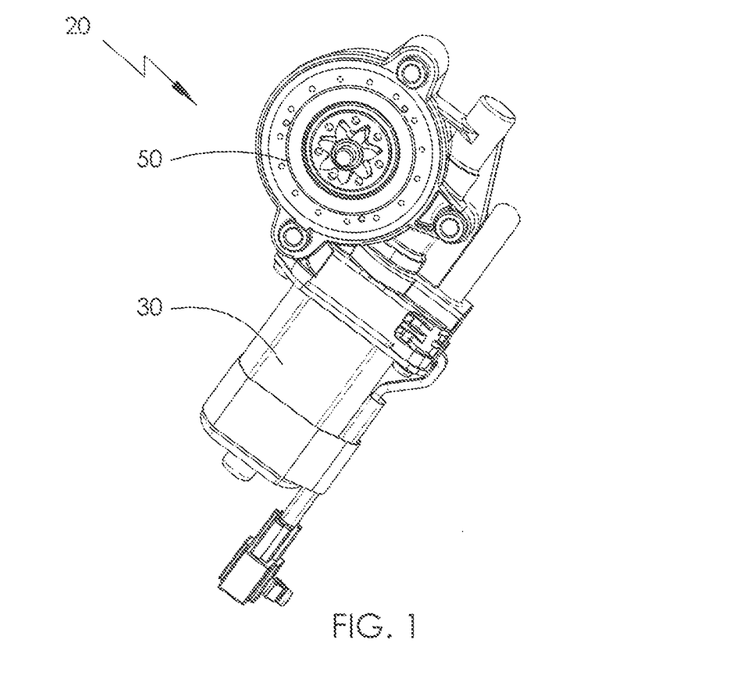
FIG. 1 is an assembled, isometric view of a gear motor assembly according to an exemplary embodiment of the present invention.
Figure 2:
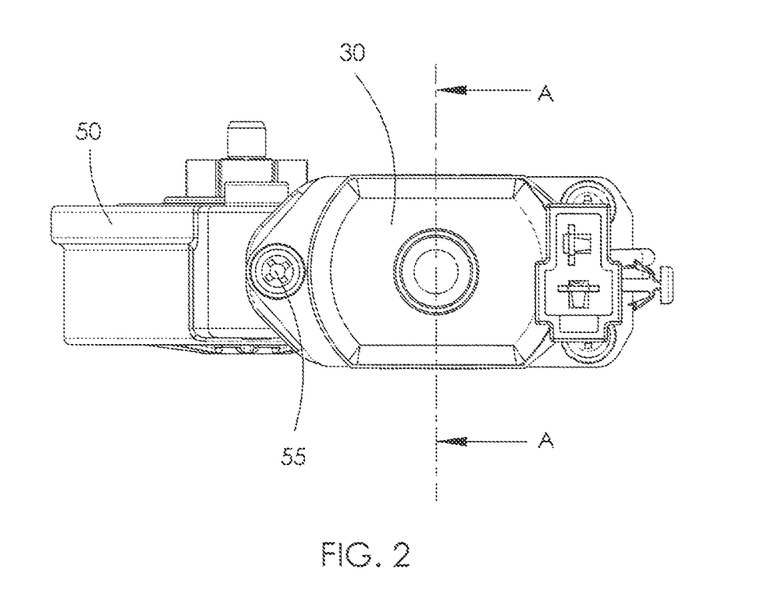
FIG. 2 is an end view of the gear motor assembly of FIG. 1.

FIGS. 1 and 2 show a gear motor assembly 20 according to an exemplary embodiment of the present invention. The gear motor assembly 20 may be a window lift drive used in a vehicle to raise or lower a window. The gear motor assembly 20 includes a motor 30 and a gearbox 50 mounted to the motor 30. In this embodiment, the motor 30 is fixed to the gearbox 50 by fasteners, such as screws 55.

Referring to FIG. 3 through FIG. 6, the motor 30 includes a stator and a rotor rotatable relative to the stator. The stator includes a housing 31 having an opening 32 facing the gearbox 50, a plurality of permanent magnets 33 attached to an inner surface of the housing 31, and a plurality of brush assemblies 35 arranged near the opening 32 of the housing 31. The rotor includes a shaft 41 with a commutator 43 and a rotor core 44 mounted thereon, and windings (not shown) wound on the rotor core 44 and connected to segments of the commutator 43. The shaft 41 extends through the opening 32 of the housing 31 and protrudes into the gearbox 50. The rotor core 44 is located within the housing 31, and the commutator 43 is located at the opening 32. Each brush assembly 35 includes a brush urged into sliding contact with the commutator 43 by a brush spring.

Figure 3:
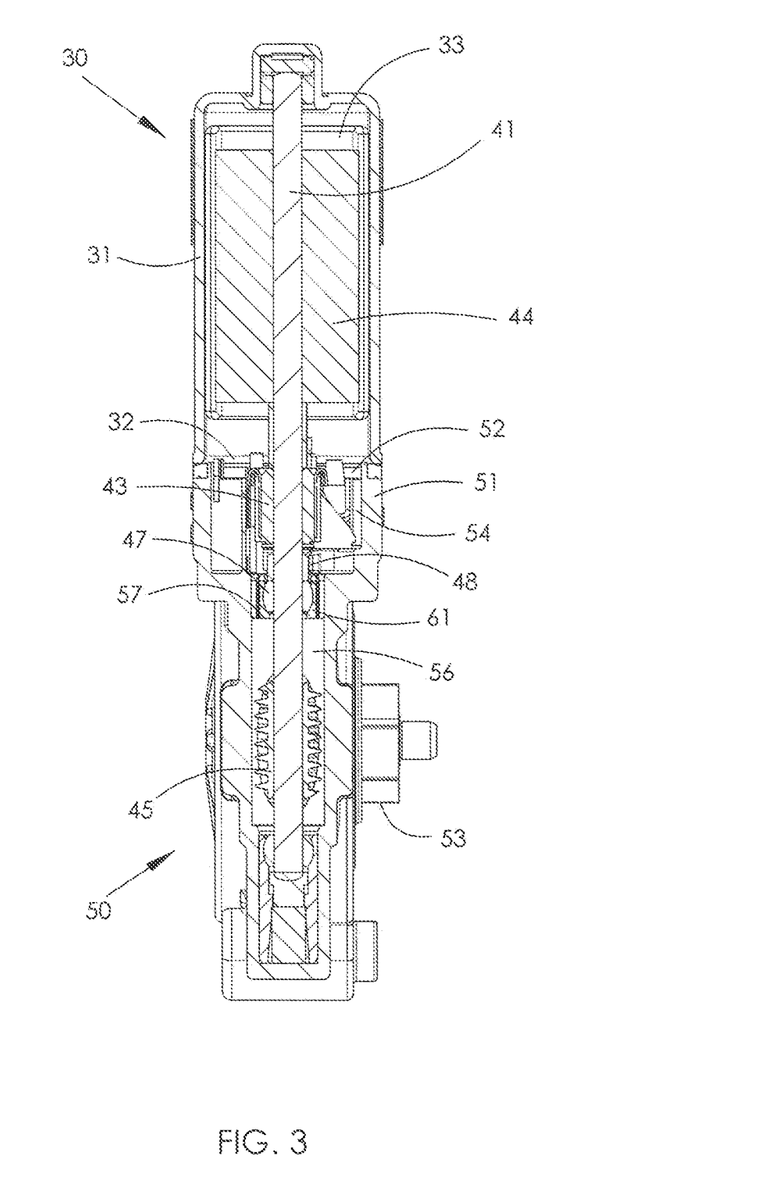
FIG. 3 is a cross section of the gear motor assembly, viewed along line A-A of FIG. 2.
Figure 4:
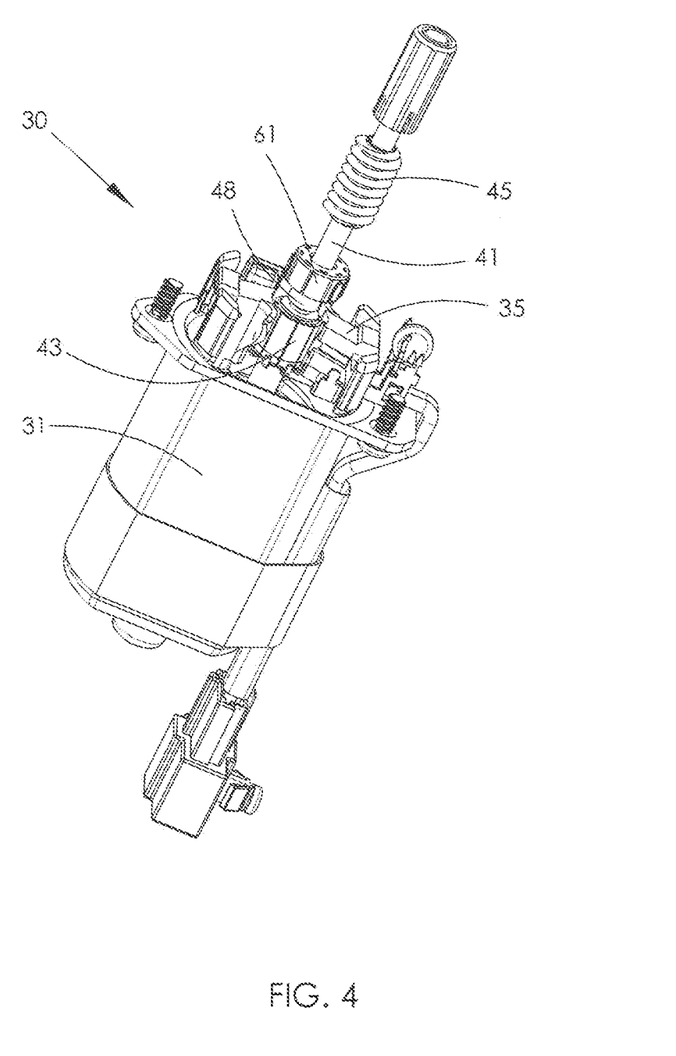
FIG. 4 shows a motor of the gear motor assembly of FIG. 1.
Figure 5:
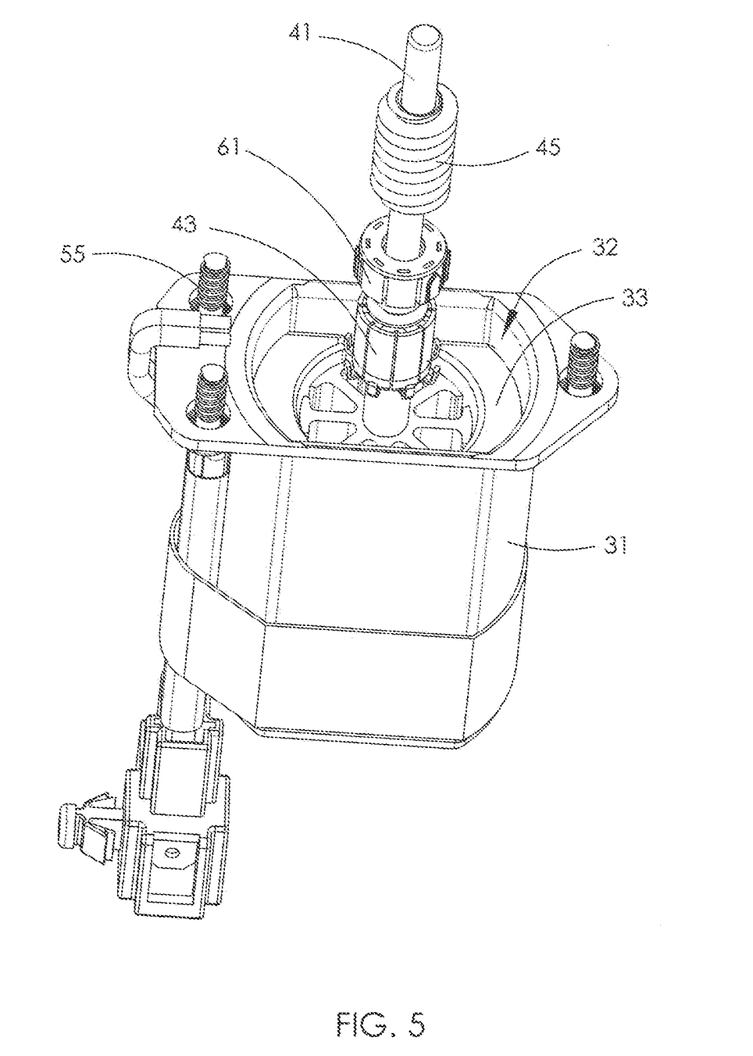
FIG. 5 shows the motor of FIG. 4, with brushes thereof removed.
Figure 6:
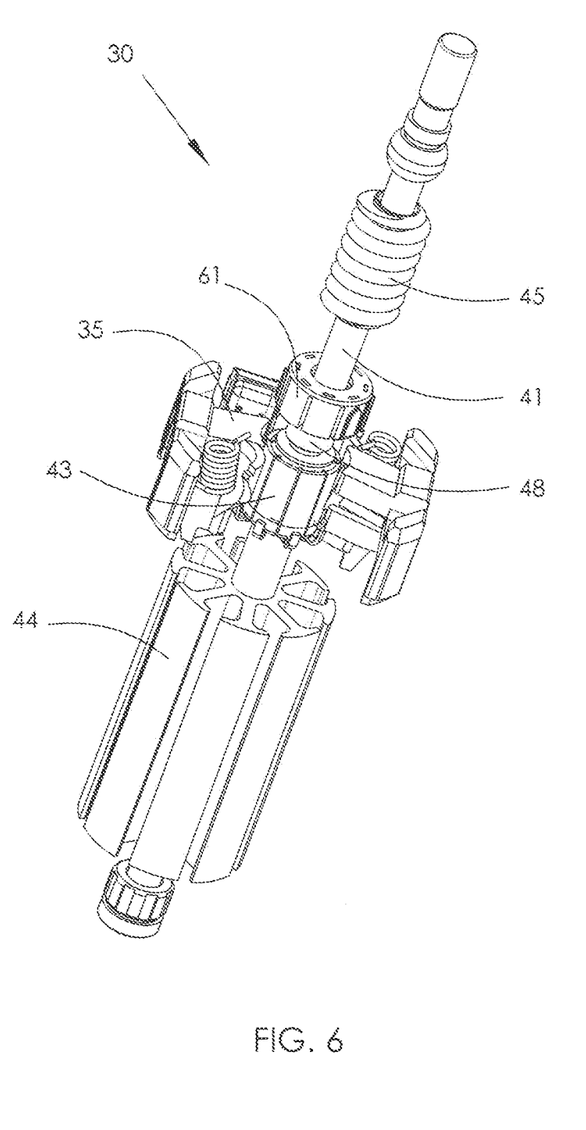
FIG. 6 shows the motor of FIG. 4, with a housing thereof removed.

The gearbox 50 includes a casing 51 and a worm gear 53 installed in the casing 51. The casing 51 has an opening 52 facing the opening 32 of the housing 31. The brush assemblies 35 are installed in the casing 51 near the opening 52, such that the brush assemblies 35 are located near the opening 32 of the motor 30 after the motor 30 is assembled to the gearbox 50. During assembly, the housing 31 and the casing 51 are connected together by screws 55, with the opening 32 of the housing 31 and the opening 52 of the casing 51 facing each other. A worm 45 is mounted on the shaft 41 within the casing 51 and rotates with the shaft. The worm 45 is in mesh with the worm gear 53 to drive the worm gear 53.

The shaft 41 has a bushing 47 mounted thereon. The bushing 47 is located between the commutator 43 and the worm 45. The bushing 47 is slidable along the shaft 41 between the commutator 43 and the worm 45.

The casing 51 of the gearbox 50 includes a first chamber 54 for accommodating the brush assemblies 35 and the commutator 43, and a second chamber 56 for accommodating the bushing 47 and the worm 45. The first chamber 54 is located closer to the opening 32 than the second chamber 56. The second chamber 56 has a diameter smaller than that of the first chamber 54.

During assembly of the gear motor assembly 20, the bushing 47 and the worm 45 are assembled to the shaft 41 after the rotor is assembled, to form a pre-assembled rotation member, including the rotor and the worm 45. Then the rotation member is balanced for better performance. After that, the rotation member is assembled to the stator of the motor 30, and then the motor 30 is connected with the gearbox 50, with the shaft 41 extending into the casing 51 of the gearbox 50.

As the bushing 47 should be fixedly mounted in the casing 51 without relative motion after being assembled, a friction force is thus required between the bushing 47 and the casing 51 to impede movement of the bushing 47 relative to the casing 51. However, the friction force also prevents the bushing 47 from moving into the second chamber 56 of the casing 51 during the insertion of the shaft 41. Since the bushing 47 is slidable relative to the shaft 41, the bushing 47 tends to move towards the commutator 43 and cannot move into the second chamber 56 of the casing 51.

In the present invention, a sleeve 48 is used to solve this problem. The sleeve 48 is fixed on the shaft 41 between the commutator 43 and the bushing 47, preventing the bushing 47 from moving towards the commutator 43 during insertion of the shaft 41. Therefore, the bushing 47 is pushed by the sleeve 48 to the proper mounting position in the second chamber 56 of the casing 51, and fixedly mounted in the casing 51 of the gearbox 50 without relative motion.

Preferably, the sleeve 48 has an outer diameter smaller than the diameter of the second chamber 56. Therefore, the sleeve 48 is able to enter into the second chamber 56 freely, and push the bushing 47 to a deeper position if required.

Preferably, the sleeve 48 is made of plastic or nylon.

Preferably, there is no force between the bushing 47 and the sleeve 48 during rotation of the sleeve 48 with the shaft 41 with respect to the bushing 47, to avoid friction between the bushing 47 and the sleeve 48. Preferably, there is no contact between the bushing 47 and the sleeve 48 after assembly of the gear motor assembly 20.

Preferably, a stop surface 57 is formed in the second chamber 56 to stop the bushing 47 when the bushing 47 arrives at the mounting position. Therefore, an accurate position of the bushing 47 can be ensured.

In the present invention, the brush assemblies 35 are separately and directly mounted on the casing 51 of the gearbox 50 without using an end cap. Thus, the worm 45 can be mounted on the shaft 41 and then balanced with the shaft 41 before the rotor is assembled with the brush assemblies 35. Therefore, the balance performance of the rotation member is optimized. Besides, the bushing 47 is mounted at the proper position in the gearbox 50 by the sleeve 48, supporting the rotating shaft 41 and preventing the shaft 41 from excessive bending during use.

Referring to FIGS. 3, and 7 to 9, in the present invention, the bushing 47 is mounted to the casing 51 of the gearbox 50 via a bushing seat 61. The bushing seat 61 includes an annular base ring 63 having a central hole, and a plurality of segments 65 extending perpendicularly from a flat surface of the base ring 63. The segments 65 are evenly arranged along a circumference of the base ring 63 and define a receiving space for accommodating the bushing 47. The bushing 47 has a spherical shape and the receiving space substantially matches the shape of the bushing 47. Specifically, each segment 65 has a curved inner surface to define the spherical receiving space cooperatively. Due to such shape, the bushing 47 is stably clasped by the segments 65 and prevented from falling out.

Figure 7:
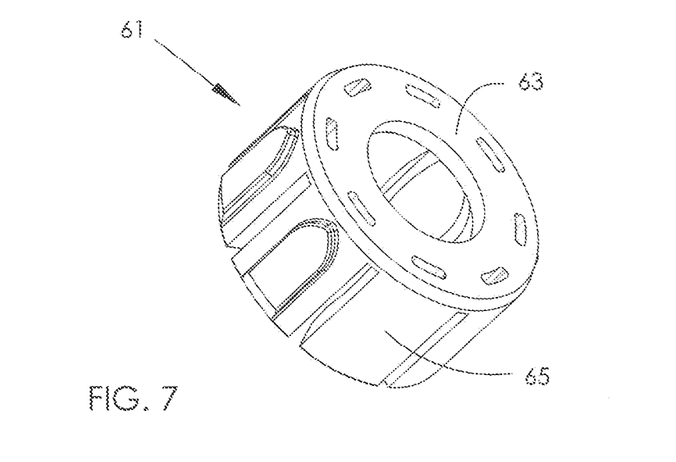
FIGS. 7 and 8 show a bushing seat of the motor of FIG. 4.
Figure 8:
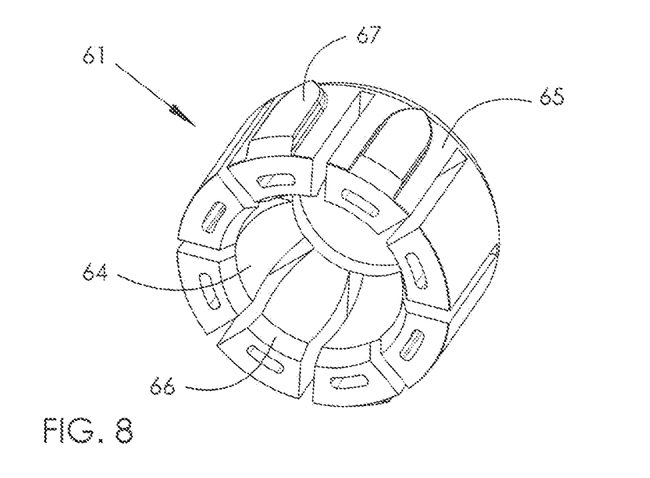
Figure 9:
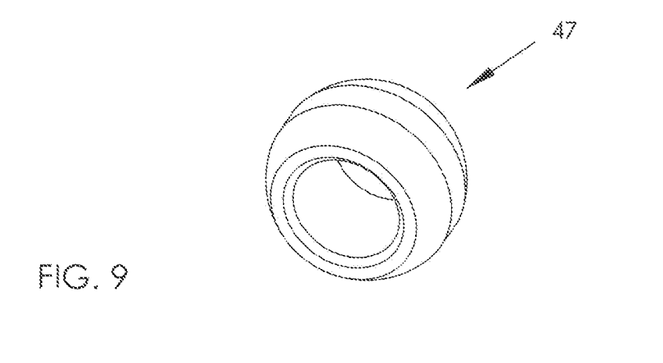
FIG. 9 shows a bushing of the motor of FIG. 4.

The bushing seat 61 is made of elastic material and therefore the segments 65 can deform under force and restore immediately after the force is removed. Preferably, each segment 65 has a fixed end adjoining the base ring 63, and a free end remote from the base ring 63. The free ends of the segments 65 are spaced from each other and thus define an opening 64 to allow the bushing 47 to enter into the receiving space.

Preferably, the free end of each segment 65 has a tapered surface 66 in the inner surface. The tapered surface 66 is inclined radially and outwardly towards the opening 64, to increase the size of the opening 64, thereby facilitating the bushing 47 to enter into the bushing seat 61.

Preferably, at least one segment 65 has an enhanced portion 67 at an outer surface thereof to increase the deformation of the bushing seat 61 when the bushing seat 61 is assembled to the casing 51 of the gearbox 50. Therefore, friction force between the bushing seat 61 and the casing 51 is increased to prevent the bushing 47 from moving in the casing 51. In this embodiment, the enhanced portion 67 is formed as a protrusion integrally formed on an outer surface of the segment 65.

In summary, the assembly process of the gear motor assembly 20 includes the following steps:

Providing a stator of a motor, including assembling magnets to an inner surface of a housing via an opening of the housing, and providing brush assemblies.

Providing a rotor of a motor, including assembling a rotor core and a commutator onto a shaft and winding windings onto the rotor core.

Fixing a sleeve onto the shaft.

Assembling a bushing onto the shaft, the bushing is assembled in a bushing seat, and the bushing is allowed to slide along the shaft.

Fixing a worm onto the shaft.

Balancing the rotor with the worm attached.

Providing a gearbox, including assembling a worm gear into a casing.

Assembling the motor, including assembling the rotor with the worm into the stator, a first end of the shaft where the worm is mounted protruding outside of the housing of the stator; and mounting the brush assemblies onto the casing of the gearbox.

Assembling the motor to the gearbox, including inserting the first end of the shaft into the casing of the gearbox, and fastening the gearbox casing with the motor housing.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A gear motor assembly comprising:
   a motor comprising a stator and a rotor, the stator comprising a housing, at least one magnet attached into the housing, and a plurality of brush assemblies, and the rotor comprising a shaft, a rotor core and a commutator fixed to the shaft;
   a gearbox connected with the motor, the gearbox comprising a casing having an opening, a worm and a worm gear in mesh with each other received in the casing, the shaft of the motor has a first end extending into the gearbox, and the worm is fixed on the shaft, and the brush assemblies of the motor are mounted in the casing at the opening;
   a bushing slidably mounted on the shaft of the motor between the commutator and the worm and fixed in the casing of the gearbox; and
   a sleeve fixed to the shaft of the motor between the commutator and the bushing to push the bushing into the casing of the gearbox during the insertion of the shaft into the gearbox,
   wherein the rotor of the motor is balanced together with the worm, and the bushing is fixedly mounted in the casing of the gearbox.

2. The gear motor assembly of claim 1, comprising a bushing seat, wherein the bushing is mounted to the casing of the gearbox via the bushing seat.

3. The gear motor assembly of claim 2, wherein the bushing seat comprises a base ring having a central hole, and a plurality of segments extending perpendicular from a surface of the base ring around the central hole, the plurality of segments cooperatively define a receiving space in which the bushing is disposed.

4. The gear motor assembly of claim 3, wherein the bushing has a spherical shape and the receiving space of the bushing seat has a shape substantially corresponding to the shape of the bushing.

5. The gear motor assembly of claim 3, wherein each segment of the bushing seat has a fixed end adjoining the base ring, and a free end remote from the base ring, the free ends of the segments are spaced from each other and define an opening for insertion of the bushing.

6. The gear motor assembly of claim 5, wherein the free ends of the segments form a tapered surface in an inner surface, the tapered surface is inclined radially and outwardly towards the opening to increase the size of the opening.

7. The gear motor assembly of claim 3, wherein at least one segment has an enhanced portion at an outer surface thereof, the enhanced portion is pressed by the casing and deformed to increase friction between the bushing seat and the casing.

8. The gear motor assembly of claim 7, wherein the enhanced portion is formed as a protrusion integrally formed on the outer surface of the segment.

9. The gear motor assembly of claim 1, wherein the casing of the gearbox comprises a first chamber for accommodating the brush assemblies and the commutator of the motor, and a second chamber for accommodating the bushing and the worm, the second chamber having a diameter smaller than the diameter of the first chamber.

10. The gear motor assembly of claim 9, wherein the sleeve has an outer diameter smaller than the diameter of the second chamber.

11. The gear motor assembly of claim 9, wherein a stop surface is formed in the second chamber, the stop surface faces the first chamber to stop the bushing when the bushing reaches a predetermined mounting position.

12. A window lift drive used in a vehicle to raise or lower a winding, comprising the gear motor assembly of claim 1.

13. The gear motor assembly of claim 1, wherein the brush assemblies are separately and directly mounted on the casing of the gearbox without using an end cap.

14. The gear motor assembly of claim 1, wherein the brush assemblies are separately and directly mounted on the casing of the gearbox without passing through the shaft.

15. A method of assembling a gear motor assembly, comprising the steps of:

providing a stator of a motor, comprising assembling at least one magnet to an inner surface of a housing, and providing a plurality of brush assemblies;

providing a rotor of a motor, comprising assembling a rotor core, a commutator onto a shaft and winding windings onto the rotor core;

fixing a sleeve onto the shaft of the motor;

assembling a slidable bushing onto the shaft of the motor;

fixing a worm to the shaft of the motor;

balancing the rotor with the worm fixed to the shaft;

providing a gearbox, comprising assembling a worm gear into a casing;

assembling the motor, comprising assembling the rotor into the stator, with a first end of the shaft where the worm locates protruding outside of the housing of the stator, and mounting the brush assemblies onto the casing of the gearbox; and assembling the motor to the gearbox, comprising inserting the first end of the shaft into the casing of the gearbox, and joining together the casing of the gearbox and the housing of the motor.

16. The method of claim 15, further comprising a step of assembling the slidable bushing in a bushing seat before the step to assemble the slidable bushing onto the shaft of the motor.

17. The method of claim 15, wherein brush assemblies are separately and directly mounted on the casing of the gearbox without using an end cap.

18. The gear motor assembly of claim 15, wherein the brush assemblies are separately and directly mounted on the casing of the gearbox without passing through the shaft.

\* \* \* \* \*